United States Patent [19]

Pfeifer et al.

[11] 3,792,923
[45] Feb. 19, 1974

[54] APPARATUS FOR RETREIVING MICROIMAGES

[75] Inventors: Josef Pfeifer; Kasimir Ambraschka, both of Unterhaching; Adolf Koopmann, Munich; Wilfried Hofmann, Munich; Karl-Heinz Dietrich, Munich; Walter Rauffer, Munich, all of Germany

[73] Assignee: Agfa-Gevaert Aktiengesellschaft, Munchen, Germany

[22] Filed: Apr. 4, 1972

[21] Appl. No.: 240,981

Related U.S. Application Data

[63] Continuation-in-part of Ser. No. 238,762, March 28, 1972, Pat. No. 3,718,391.

[30] Foreign Application Priority Data

Apr. 6, 1971    Germany............................ 2116813

[52] U.S. Cl.................................. 353/27, 353/101
[51] Int. Cl...................... G03b 21/11, G03b 23/08
[58] Field of Search....................... 353/25–27, 100, 353/101

[56] References Cited
UNITED STATES PATENTS
1,918,468    7/1933    Harding................................ 353/26

Primary Examiner—Louis R. Prince
Assistant Examiner—A. J. Mirabito
Attorney, Agent, or Firm—Michael S. Striker

[57] ABSTRACT

A microform reader wherein two holders for discrete microforms are movable in parallel horizontal planes below two objectives whose focal planes coincide with the planes of microforms in the respective holders. A light source furnishes a light beam which is deflected at right angles to the planes of the microforms and the objectives are mounted on a carrier which is pivotable by the holders to place the one or the other objective into register with the deflected light beam. Alternatively, a mirror which reflects the light beam can be mounted on a reciprocable carrier which can place the deflected light beam into register with one of the two objectives which are then fixedly mounted in the housing. The carrier for the objectives or for the mirror can receive motion from a slide which is reciprocable by the holders.

15 Claims, 2 Drawing Figures

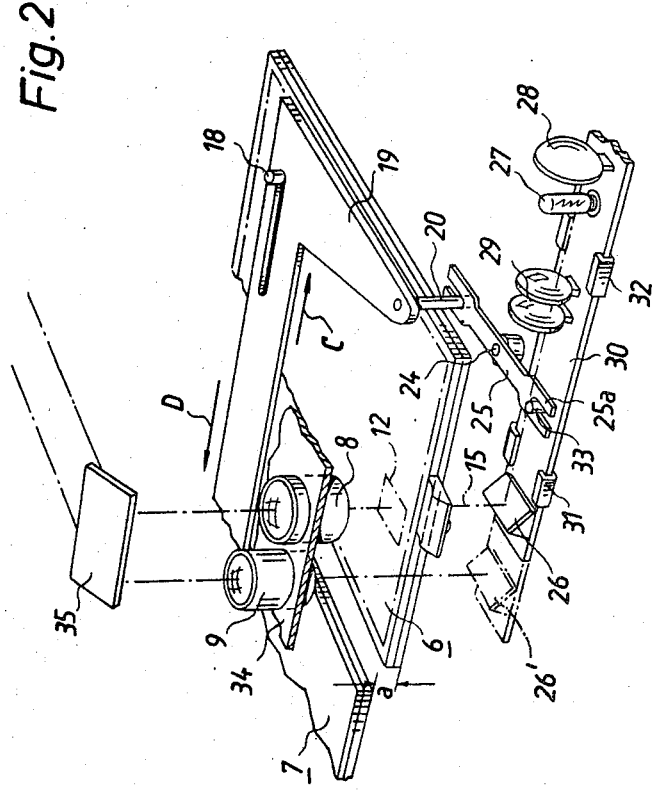

APPARATUS FOR RETRIEVING MICROIMAGES

CROSS-REFERENCE TO RELATED APPLICATION

This is a continuation-in-part of our copending application Ser. No. 238,762, now U.S. Pat. No. 3,718,391 filed Mar. 28, 1972 and entitled "Microfilm Reading Apparatus".

BACKGROUND OF THE INVENTION

The present invention relates to improvements in microfilm reading or microimage retrieving apparatus. More particularly, the invention relates to improvements in microfilm reading apparatus of the type wherein several micro-forms are mounted in discrete holders which are located in different planes and are movable with and/or relative to each other in order to place selected microforms into a projection position in which the image of such part of the selected microform is enlarged and projected onto an observation screen. Still more particularly, the invention relates to improvements in apparatus wherein a selected part of any one of several microforms can be rapidly moved across the path of a directed light beam so that its image can be enlarged and observed on a screen or the like.

Presently known microfilm reading apparatus comprise a single objective whose focal plane must be placed into register with the planes of microforms. This normally entails lengthy adjustments when the user wishes to terminate the observation of one or more parts of a first microform in order to begin the observation of one or more parts of a second microform which is located in a different plane. Such mode of operation is time-consuming. Our aforementioned copending application discloses an apparatus wherein a single adjustment to the objective suffices to insure accurate focussing onto several microforms which are located in different planes.

SUMMARY OF THE INVENTION

An object of the invention is to provide a novel and improved microfilm reading or microimage retrieving apparatus wherein the objective means which is used to project the images of selected parts on any one of several microforms need not be adjusted at all when the user wishes to switch from the observation of one microform to the observation of another microform or vice versa.

Another object of the invention is to provide the microimage retrieving apparatus with novel and improved objective means for projecting the images of selected parts of any one of several parallel microforms onto a screen or the like.

A further object of the invention is to provide a microimage retrieving apparatus wherein the time which is spent to project a selected part of any one of several microforms onto a screen is shorter than in heretofore known apparatus.

An additional object of the invention is to provide an apparatus which need not be provided with any means for moving the objective means at right angles to the planes of several parallel microforms.

Still another object of the invention is to provide novel and improved means for supporting the projection lamp and other components of the illuminating system in an apparatus for the reading of microfilms which are mounted at different levels.

The invention is embodied in a microimage retrieving apparatus which comprises a plurality of holders each arranged to support and preferably confine a discrete microform or microsheet in one of a plurality of parallel planes, a first unit which includes a discrete objective for each holder whereby the focal plane of each objective coincides with the plane of the microform in the respective holder, a source of light which furnishes a light beam, a second unit including means for directing the light beam substantially at right angles to the planes of the micrforms, carrier means which supports one of the two units and is movable between a plurality of positions in each of which the directed light beam impinges upon a different objective, and guide means for the holders. The holders are movable with reference to the other unit and relative to the guide means so as to maintain the microforms in their respective planes and to place a selected part of the microform in a selected holder between the respective objective and the light directing means while the light beam impinges upon such objective whereby the objective projects the image of the selected microform part.

The carrier means may be pivotable or reciprocable between its positions and the light source may be mounted on such carrier means if the latter supports the second unit. Such second unit may comprise a light reflecting mirror or an apertured diaphragm.

The holders are preferably movable to and from predetermined end positions in which their microforms are without the range of the respective objectives. The apparatus preferably further comprises means for moving the carrier means to different positions in response to movement of different holders to their respective end positions. The arrangement is such that, when a holder is moved to its end position, the moving means automatically moves the objective for the microform in another holder into register with the light directing means or vice versa, depending upon whether the carrier means supports the first or the second unit.

The novel features which are considered as characteristic of the invention are set forth in particular in the appended claims. The improved microimage retrieving apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a similar fragmentary perspective view of a modified apparatus which employs two fixedly mounted objectives.

DESCRIPTION OF THE PREFERRED EMBODIMENTS

Figure 1:
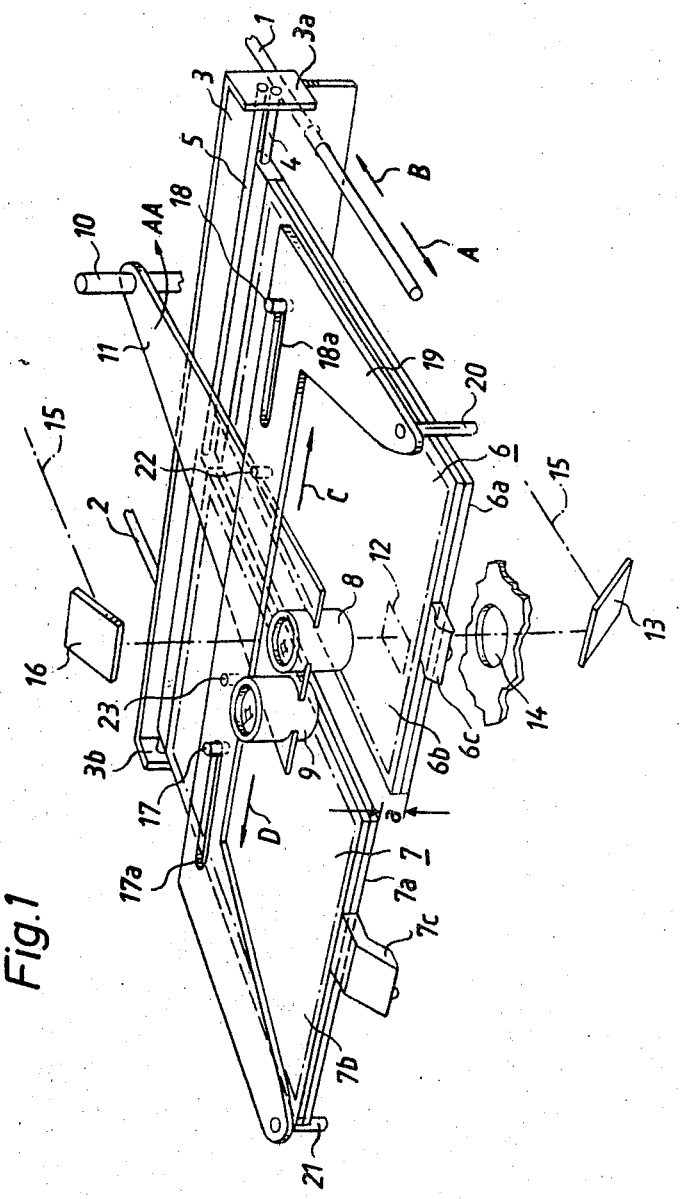
FIG. 1 is a fragmentary perspective view of an apparatus which embodies one form of the invention and employs two movable objectives.

Referring first to FIG. 1, there is shown a portion of a microfilm reading or microimage retrieving apparatus which comprises a housing supporting a pair of spaced apart parallel horizontal guide members in the form of tie rods 1 and 2 serving to support and guide a main slide or carriage 3 for movement toward (arrow A)

and away (arrow B) from the observer of the image which appears on a suitable screen, not shown. Reference may be had to our aforementioned copending application which shows that the screen is preferably mounted in the housing at a level above the objective means.

The carriage 3 supports two additional horizontal guide members or tie rods 4, 5 which are parallel to each other and normal to the tie rods 1, 2. The tie rods 4 and 5 respectively support pivotable and reciprocable holders 6, 7 each of which has a rectangular frame fixedly supporting a lower transparent panel 6a, 7a and pivotably supporting an upper transparent panel 6b, 7b. The lower holder 6 is reciprocable along the lower tie rod 4 of the carriage 3 in directions indicated by the arrows C and D. Furthermore, the lower holder 6 is pivotable about the axis of the tie rod 4, and its upper panel 6b is pivotable with reference to the lower panel 6a about an axis which is parallel and preferably closely adjacent to the tie rod 4. In this manner, the user of the apparatus can gain access to the space between the panels 6a, 6b in order to remove a previously observed microfilm sheet or microform and to replace such microform with another microform. The construction of the holder 7 is analogous, i.e., this holder is also movable in directions indicated by the arrows C, D and is pivotable about the axis of the respective tie rod 5. Furthermore, the upper panel 7b can be pivoted to afford access to a previously observed microform and to allow rapid replacement of such microform with a different microform. The manner in which the forwardly and downwardly extending projections or handgrip portions 6c, 7c of the holders 6, 7 can be slid along a supporting plate (which is preferably transparent) is preferably the same as disclosed in our copending application. The lower portion of the housing of the apparatus may be provided with a stack of drawers for storage of microforms. When the handgrip portions 6c, 7c rest on the aforementioned supporting plate, the parallel planes of the microforms between the panels 6a, 6b and 7a, 7b are spaced apart by a distance a. The four panels are preferably of identical thickness and have identical sizes.

Lateral stops 3a, 3b on the carriage 3 limit the extent of movement of the holders 6, 7 along the respective tie rods 4 and 5. Analogous stops (not shown) are provided in the housing to limit the extent of forward and rearward movement of the carriage 3 along the tie rods 1 and 2. The distance a is sufficient to insure that the holder 6 can be moved at a level below the lower panel 7a of the holder 7 and that the holder 7 can be moved at a level above the upper panel 6b of the holder 6.

The apparatus further comprises a first unit consisting of two objectives 8, 9 which respectivley serve to project the images of selected parts of microforms in the holders 6 and 7. The objectives 8 and 9 are mounted in a carrier lever 11 which is pivotable about the vertical axis of a shaft 10 mounted in the housing of the apparatus. The objectives 8 and 9 are preferably of identical type and are mounted in the carrier lever 11 in such a way that the focal plane of the objective 8 coincides with the plane of a microform between the panels 6a, 6b of the holder 6 and that the focal plane of the objective 9 coincides with the plane of a microform between the panels 7a, 7b of the holder 7. Thus, the distance between the focal planes of the objectives 8 and 9 equals the distance a. As shown in FIG. 1, the objectives 8 and 9 are mounted closely adjacent to each other and share all pivotal movements of the carrier lever 11 about the axis of the shaft 10. If desired, the carrier may be provided with means for adjusting the positions of objectives 8 and 9 so as to insure that the focal plane If each of these objectives conicides exactly with the plane of the microform in the associated holder.

The apparatus further comprises a projection lamp or an analogous light source (see the lamp 27 of FIG. 2) which emits a beam 15 of light which is reflected by a suitably positioned mirror 13 mounted in the housing at a level below the plane of the lower holder 6. The mirror 13 reflects the light beam 15 through the aperture of a stationary diaphragm 14 which is mounted in the housing and serves to confine the beam substantially to the area (12) which is to be viewed when the projection lamp is on. By pivoting the carrier lever 11 between two end positions, the user can place the illuminated area 12 into register with the objective 8 (for observation of a selected part of the microform in the holder 6) or with the objective 9 (for observation of a selected part of the microform between the panels 7a, 7b of the holder 7). FIG. 1 shows the objective 8 in register with the area 12, i.e., the apparatus is ready to allow for observation of a selected part of a microform between the panels 6a, 6b of the holder 6. In order to place a selected part of such microform into register with the area 12 and objective 8, the user simply grasps the handgrip portion 6c and moves the holder 6 with the carriage 3 (arrow A or B) whereby the carriage slides along the tie rods 1, 2 and/or the user moves the holder 6 with reference to the carriage 3 (arrow C or D) by sliding the holder 6 along the respective tie rod 4. This enables the user to rapidly place a selected part of the microform into projection position. The objective 8 projects the image of the selected microform part against a mirror 16 which in turn deflects the image against one or more additional mirrors (not shown) before the image reaches the observation screen of the apparatus.

By pivoting the carrier lever 11 in the direction indicated by the arrow AA, the user can move the objective 9 into register with the aperture of the diaphragm 14 whereby the apparatus is ready to permit observation of a selected part of the microform which is located between the panels 7a, 7b of the holder 7. The user then simply manipulates the handgrip portion 7a of the holder 7 in order to superimpose a selected part of such microform upon the area 12 whereby the objective 9 projects the image onto the screen by way of the mirror 16 and one or more additional mirrors. By replacing the mirrors 13, 16 (and the other mirrors) with mirrors of greater width (as considered in the longitudinal direction of tie rods 4 and 5), the apparatus can be readily modified in such a way that the objective 14 (and the illuminated area 12) could be shifted back and forth to thereby change the positions of the objectives 8 and 9. The diaphragm 14 constitutes the light directing means of a second unit which is fixedly mounted in the housing.

In order to insure automatic placing of the objective 8 or 9 into register with the diaphragm 14, the apparatus of FIG. 1 further comprises means for moving the objective 9 into register with the diaphragm 14 in response to movement of the holder 6 to a predetermined (right-hand) end position and for moving the objective 8 into register with diaphragm 14 in response to movement of the holder 7 to a predetermined (left-hand) end position. In the illustrated apparatus, such automatic moving means comprises a slide 19 which is formed with elongated slots 17a, 18a for two stationary guide pins 17, 18 so that it can move in directions indicated by the arrows C and D. The slide 19 is provided with downwardly extending motion receiving pins 20 and 21 which are positioned in such way that the slide 19 is moved to its right-hand end position by way of the pin 20 in response to movement of the holder 6 to the right-hand end position and that the slide 19 is moved to its left-hand end position (by the pin 21) in response to movement of the holder 7 to the left-hand end position. The median portion of the slide 19 is provided with two motion transmitting projections or studs 22, 23 which can pivot the carrier lever 11 for the objectives 8 and 9. The arrangement is such that, when the user of the apparatus grasps the handgrip portion 6a and moves the holder 6 to its right-hand end position, the right-hand edge face of the holder 6 engages the mot receiving pin 20 shortly before the holder 6 reaches the right-hand end position, i.e., during a predetermined stage of movement of the holder 6 to such end position, whereby the slide 19 moves in the direction indicated by the arrow C and its motion transmitting stud 23 pivots the carrier lever 11 in the direction indicated by the arrow AA so as to move the objective 9 into register with the illuminated area 12 and hence into register with the diaphragm 14. The user thereupon proceeds to manipulate the holder 7 by way of the handgrip portion 7a so as to superimpose a selected part of the microform between the panels 7a, 7b upon the illuminated area 12 whereby the image of such selected part is projected onto the screen.

If the user thereupon decides to move the holder 7 to its left-hand end position, the left-hand edge face of the holder 7 engages and entrains the pin 21 shortly before the holder 7 reaches such end position. This causes the pin 21 to entrain the slide 19 in the direction indicated by the arrow D, and the motion transmitting stud 22 pivots the carrier lever 11 counter to the direction indicated by the arrow AA so as to place the objective 8 back into register with the diaphragm 14 as soon as the holder 7 reaches its left-hand end position. The arrangement is preferably such that the microform between the panels 6a, 6b is located to the right of the illuminated area 12 when the holder 6 reaches its right-hand end position, and that the microform between the panels 7a, 7b is located to the left of the illuminated area 12 when the holder 7 reaches its left-hand end position. It will be seen that the placing of the holder 6 or 7 into the corresponding end position automatically entails a movement of the objective 9 or 8 into register with the diaphragm 14. This simplifies the manipulation of the apparatus since the user need not be concerned with adjustments of the carrier lever 11; such adjustments are effected automatically in response to movement of the microform in the holder 6 or 7 from a position of overlap with the illuminated area 12. The light beam 15 which is directed by the diaphragm 14 is at least substantially normal to the planes of microforms in the holders 6 and 7.

FIG. 2 illustrates a portion of a modified apparatus with a first unit including two fixedly mounted objectives 8, 9 and a second unit including a movable diaphragm here shown as a light-deflecting mirror 16 which is mounted on a reciprocable carrier 30. The manner in which the holders 6 and 7 are mounted on the tie rods of a reciprocable carriage (not shown) is the same as described in connection with FIG. 1. The objectives 8, 9 are mounted on a stationary supporting plate 34 in such positions that their focal planes respectively coincide with the planes of the microforms between the panels of the holders 6 and 7. The slide 19 is identical with or analogous to the slide 19 of FIG. 1. Its motion receiving pin 20 engages one arm of a two-armed motion transmitting and direction-reversing lever 25 which is fulcrumed in the housing, as at 24, and the other arm 25a of which is bifurcated to receive a post 33 of the carrier 30. The latter is guided in bearing members 31, 32 of the housing and, in addition to the aforementioned diaphragm or mirror 26, supports the projection lamp 27 which is located in front of a reflector 28 and behind a system of condenser lenses 29. The mirror 16 of FIG. 1 is replaced by a wider mirror 35 which can project the image of a selected portion of the microform between the panels of the holder 6 or between the panels of the holder 7. When the slide 19 is caused to move in the direction indicated by arrow C or D, the lever 25 causes the carrier 30 to move in the direction indicated by arrow D or C.

The main difference between the apparatus of FIGS. 1 and 2 is that the objectives 8, 9 are stationary and that the light directing means 26 is movable with the illuminated area 12 between the solid-line position of register with the objective 8 and the phantom line position 26' of register with the objective 9. Thus, instead of supporting the objectives 8 and 9, the carrier 30 of FIG. 2 supports the light directing means 26. The manner in which the carrier 30 is moved by way of the motion receiving pin 20 in response to movement of the slide 19 to its right-hand or left-hand end position is clearly analogous to the manner in which the studs 22, 23 on the slide 19 of FIG. 1 can pivot the carrier lever 11.

The apparatus of the present invention is susceptible of many additional modifications. For example, two or more objectives can be used with advantage in apparatus of the type disclosed in Pat. No. 3,319,518 to Carlson wherein the holders for discrete microforms cannot move independently of each other, i.e., wherein such holders form a package which is movable as a unit. Also, the apparatus of FIG. 1 or 2 can employ more than two holders and an equal number of objectives.

Without further analysis, the foregoing will so fully reveal the gist of the present invention that others can, by applying current knowledge, readily adapt it for various applications without omitting features which fairly constitute essential characteristics of the generic or specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a microimage retrieving apparatus, the combination of a plurality of holders each arranged to support a discrete microform in one of a plurality of parallel planes; a first unit including a discrete objective for each of said holders, each objective having a focal plane coinciding with the plane of the microform in the respective holder; a source of light arranged to furnish a light beam; a second unit including means for directing said light beam substantially at right angles to said planes; carrier means supporting one of said units and movable between a plurality of positions in each of which the directed light beam impinges upon a different objective; and guide means for said holders, said holders being movable with reference to said units and relative to said guide means so as to maintain the microforms in their respective planes and to place a selected part of the microform in a selected holder between the respective objective and said light directing means while the light beam impinges upon such objective so that the latter projects the image of the selected microform part.

2. The combination of claim 1, wherein each of said holders comprises a pair of transparent panels located at the opposite sides of the respective plane.

3. The combination of claim 1, wherein said one unit is said second unit and said light directing means comprises a diaphragm.

4. The combination of claim 3, wherein said light directing means also comprises a light reflecting mirror.

5. The combination of claim 1, wherein said one unit is said first unit.

6. The combination of claim 5, wherein said carrier means is pivotable between said positions thereof.

7. The combination of claim 1, wherein each of said holders is movable to and from a predetermined position and further comprising means for moving said carrier means to a different one of said positions thereof in response to movement of different holders to the respective predetermined positions.

8. The combination of claim 7, wherein said means for moving said carrier means comprises motion transmitting means for moving said carrier means during predetermined stages of movement of said holders to the respective predetermined positions.

9. The combination of claim 7, wherein said means for moving said carrier means comprises a reciprocable slide.

10. The combination of claim 9, wherein said carrier means is pivotable about a predetermined axis which is parallel to the optical axes of said objectives.

11. The combination of claim 10, wherein said one unit is said first unit.

12. The combination of claim 7, wherein said carrier means is reciprocable between said positions thereof and said one unit is said second unit.

13. The combination of claim 12, wherein said means for moving said carrier means comprises a reciprocable slide and a lever pivotable about a predetermined axis and having first and second arms respectively coupled with said carrier means and said slide.

14. The combination of claim 13, wherein said lever is arranged to move said carrier means in a first direction in response to movement of said slide in a second direction counter to said first direction, and vice versa.

15. The combination of claim 13, wherein said source of light is mounted on and shares the movements of said carrier means.

* * * * *